*INVENTOR.*
ROBERT O. CASE JR

Jan. 10, 1961 R. O. CASE, JR 2,968,010
AMPLITUDE MODULATOR
Filed Jan. 6, 1958 6 Sheets-Sheet 5

INVENTOR.
ROBERT O. CASE JR.
BY
Louis J. Knobbe
AGENT

Jan. 10, 1961   R. O. CASE, JR   2,968,010
AMPLITUDE MODULATOR
Filed Jan. 6, 1958   6 Sheets-Sheet 6

INVENTOR.
ROBERT O. CASE JR.
BY Louis J. Knobbe
AGENT

United States Patent Office 2,968,010
Patented Jan. 10, 1961

2,968,010

AMPLITUDE MODULATOR

Robert O. Case, Jr., Whittier, Calif., assignor to North American Aviation, Inc.

Filed Jan. 6, 1958, Ser. No. 707,317

14 Claims. (Cl. 332—41)

This invention relates to amplitude modulators and particularly to those embodying time division techniques.

Amplitude modulators are commonly used as computing elements in analog computers. Examples of amplitude modulators commonly used in this application are chopper, square law, and servo driven potentiometer modulators. However, current designs of each of these circuits contain certain undesirable characteristics. The chopper modulator produces a square wave rather than a desired sinusoidal output. An attempt to filter the harmonics from the output results in an undesirable phase shift if the carrier frequency varies slightly. The square law modulator does not meet rigid requirements of output linearity. Servo driven potentiometer modulators are comparatively bulky and have a narrow bandwidth.

The present invention, while of general utility, has been designed for the particular requirement of airborne computer applications. As such, the requirement of a linear circuit with a sinusoidal output has been coupled with additional design criteria including circuitry of long life and low maintenance problems and also a completed package of small size and weight. In order to meet these requirements an amplitude modulator has been designed around the time division technique. Although the basic principles of time division are known and have previously been used in certain multiplier circuits, it is believed that the present amplitude modulator embodies a novel design not heretofore described in the prior art.

It is accordingly an object of this invention to provide an improved amplitude modulator.

It is also an object of this invention to provide an amplitude modulator embodying time division techniques.

It is another object of this invention to provide an amplitude modulator inherently operating as a suppressed-carrier amplitude modulator.

It is still another object of this invention to provide an amplitude modulator characterized by linearity of operation.

A further object of this invention is to provide an amplitude modulator providing a faithful reproduction of the modulating wave form with small harmonic distortion and phase shift.

It is another object of this invention to provide an amplitude modulator having a reasonably wide band.

It is another object of this invention to provide an amplitude modulator embodying circuitry having a long service life with low maintenance requirements.

A further object of this invention is to provide an amplitude modulator characterized by light weight and a physically small package.

It is another object of this invention to provide an amplitude modulator requiring no moving parts such as sliding electrical contacts.

It is still another object of this invention to provide an amplitude modulator having a sinusoidal output.

A further object of this invention is to provide an amplitude modulator which is phase sensitive.

It is another object of this invention to provide an amplitude modulator which is substantially free from drift.

It is still another object of this invention to provide an amplitude modulator having a relatively wide dynamic range.

A further object of this invention is to provide an amplitude modulator having an alternating signal output directly proportional in amplitude to the amplitude of the modulating-frequency signal.

It is another object of this invention to provide an amplitude modulator having an alternating signal output inversely proportional in amplitude to the amplitude of a direct-current reference signal.

It is still another object of this invention to provide an amplitude modulator having an alternating signal output directly proportional in amplitude to the ratio of the amplitude of the carrier-frequency signal to the amplitude of a direct current reference signal.

Briefly, in accordance with one form of the present invention, a modulating wave form of relatively low frequency is periodically sampled at a relatively high frequency. The duty cycle of the sampling periods is varied in accordance with the desired carrier-frequency signal. The periodically sampled modulating wave form is then transmitted through a band pass filter which transmits the side bands of the modulated carrier-frequency signal and attenuates the frequencies of the sampling period and their associated harmonics. With certain types of sampling switches, the filter must also attenuate the frequencies of the modulating-frequency signal. The output of the band pass filter is a suppressed-carrier amplitude-modulated wave.

A more thorough understanding of the invention may be obtained by a study of the following detailed discussion taken in conjunction with the accompanying drawings in which.

Figure 6:
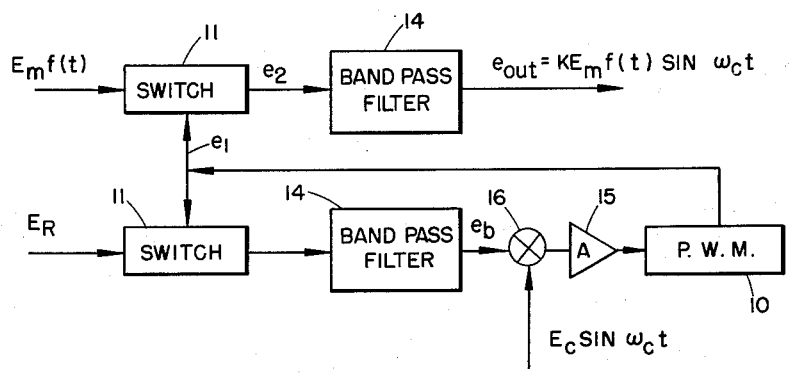
Figure 4:
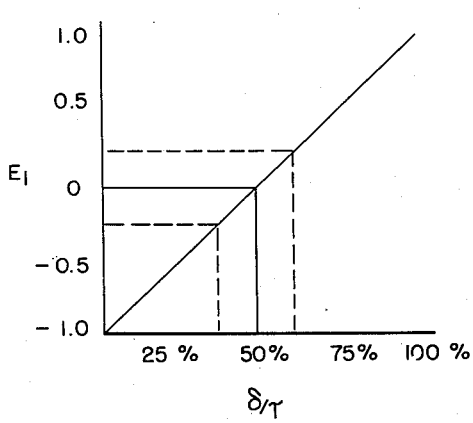
Figure 7:
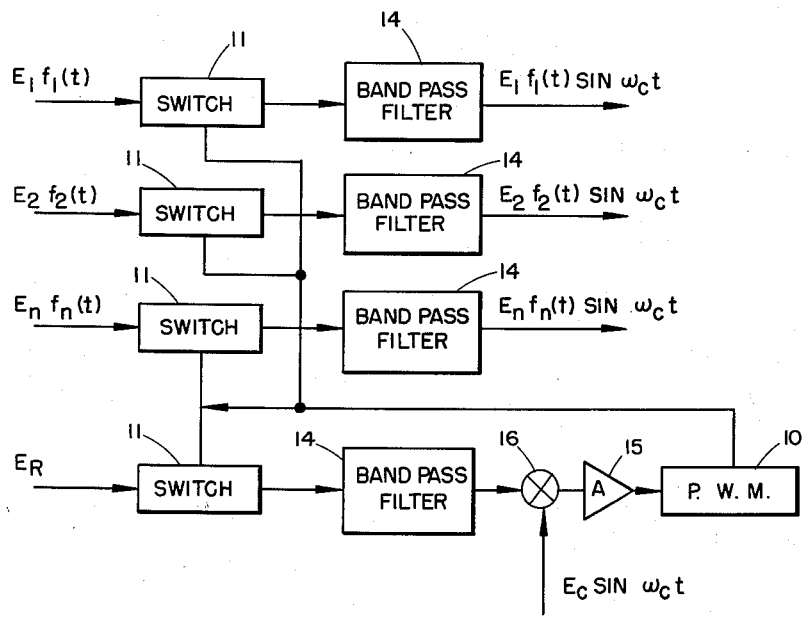
Figure 8:
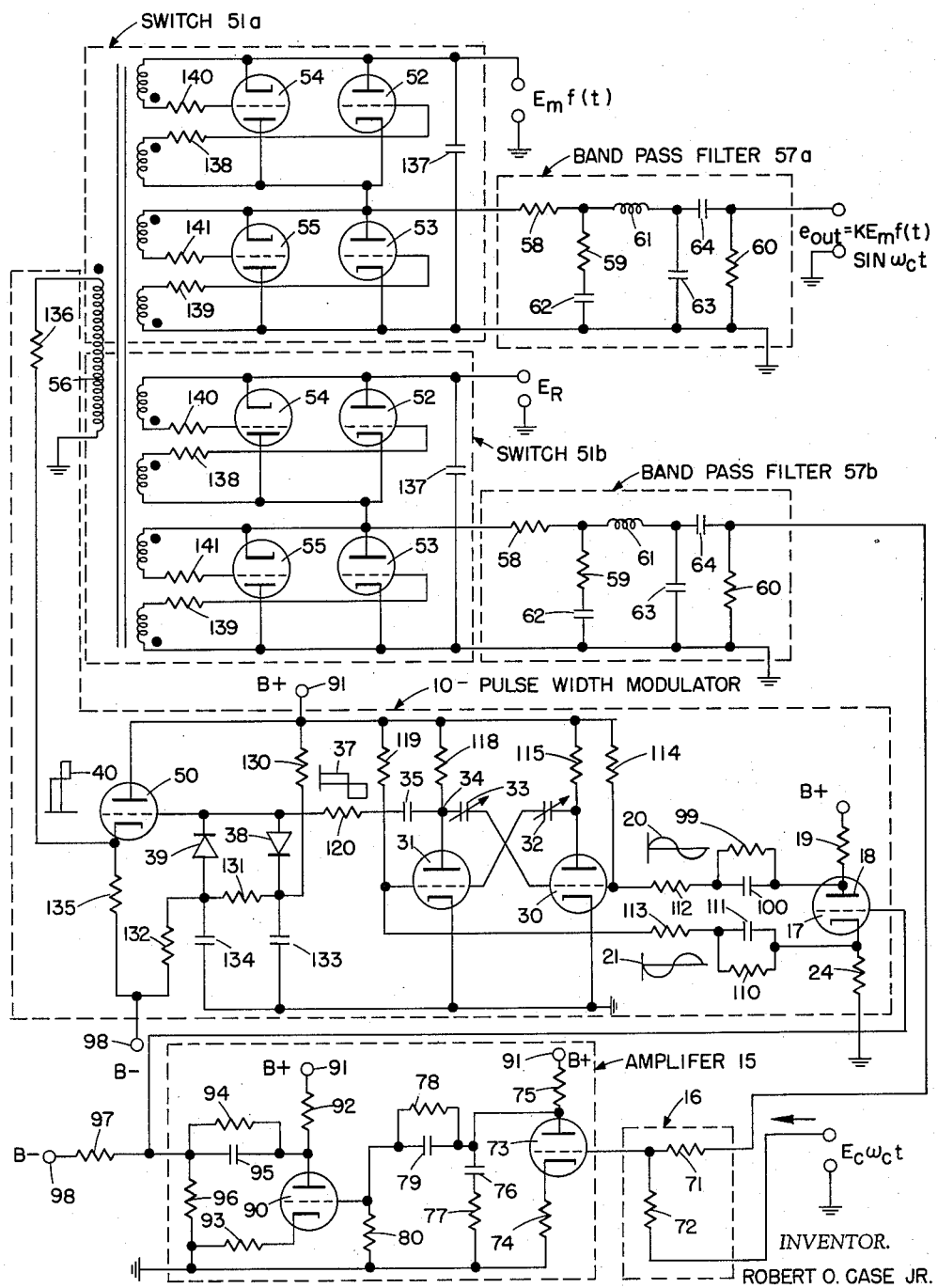

Figs. 3a, 3b, 3c, and 3d illustrate schematically four types of switches which may be utilized in this invention;

Fig. 4 is a graph of the average voltage output from the pulse width modulator plotted against the duty cycle of the pulse width modulator;

Figs. 5a through g illustrate the wave forms at various points in the amplitude modulator circuit;

Fig. 6 is a block diagram of another embodiment of this invention;

Fig. 7 is a block diagram of a further embodiment of this invention;

Fig. 8 is a schematic diagram of an amplitude modulator circuit; and

Figure 9:
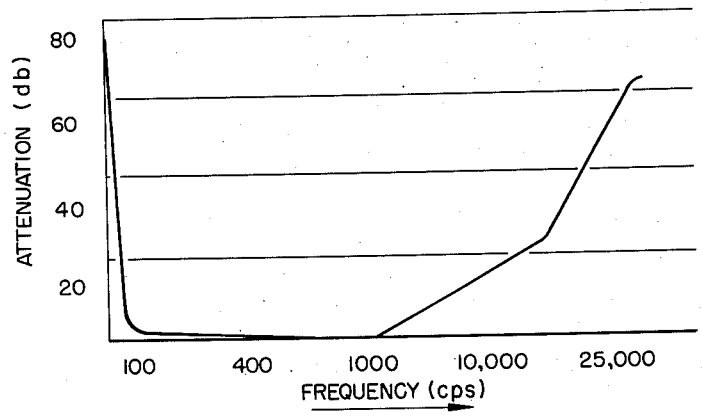

Fig. 9 is a graph illustrating the attenuation characteristics of the filter utilized in this invention.

Figure 1:
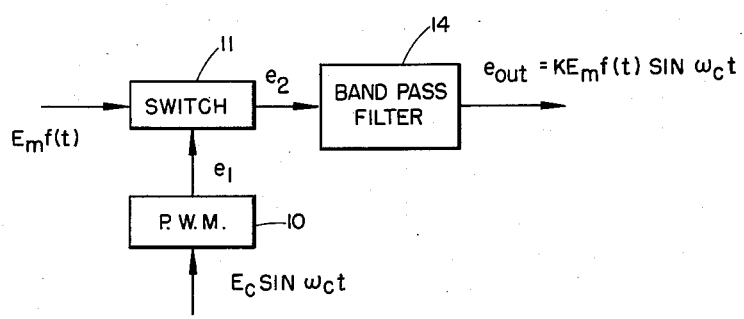
Fig. 1 is a block diagram of one embodiment of this invention.
Figure 2:
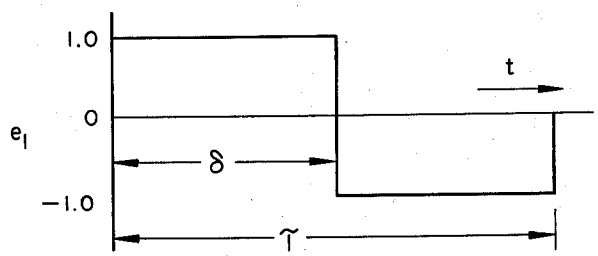
Fig. 2 is a diagram of a single pulse output from a pulse width modulator.

Referring now to Fig. 1, a pulse width modulator circuit (PWM) 10 is connected to switch 11. The pulse width modulator may be supplied with a series of periodic pulses from an external source (not shown) or it may itself generate the required pulses. Illustrated in Fig. 2 is a single switching pulse $e_1$ from the pulse width modulator. It may be noted that this pulse has a period of length $\tau$ and a duty cycle equal to $$\frac{\delta}{\tau}$$

The pulse amplitude may, of course, be any required magnitude but for simplicity is illustrated as having positive and negative values of one volt.

Figure 3A:
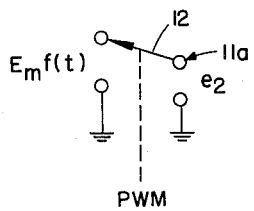

Several embodiments of switch 11 are illustrated in Figs. 3a, 3b, 3c, and 3d. Switch 11a, as shown in Fig. 3a, includes a single pole-double throw switch 12 having the modulating-frequency signal $[E_m f(t)]$ as an input and $e_2$ as an output. Thus, if the movable contact of the double throw switch 12 is operated in response to the switching signal $e_1$ from the pulse width modulator 10, the modulating-frequency signal is periodically sampled. Stated in another way, a low impedance transmission path will periodically be provided for $E_m f(t)$. Therefore, during periods in which the movable contact is in the position shown, the modulating-frequency signal will appear at the output of the switch as $e_2$; during the remaining period of a cycle the output will be grounded and the output of the switch is zero.

Figure 3C:
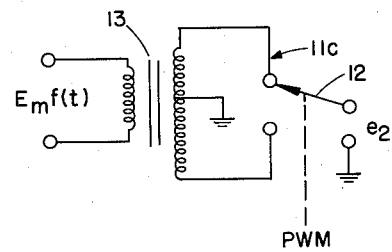
Figure 3B:
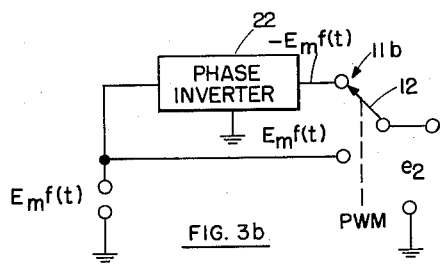

Switch 11b, as shown in Fig. 3b, includes a phase inverter 22 for accomplishing a phase inversion of the modulating-frequency signal. The movable contact of the double throw switch 12 is connected either to $E_m f(t)$ or $-E_m f(t)$. Switch 11b therefore provides a full wave sampling of $E_m f(t)$ by operating the movable contact in response to the switching signal from the pulse width modulator 10. Thus, the output signal $e_2$ from the switch changes from $E_m f(t)$ to $-E_m f(t)$ periodically as contrasted with switch 11a whose output changes from $E_m f(t)$ to zero periodically.

Figure 3D:
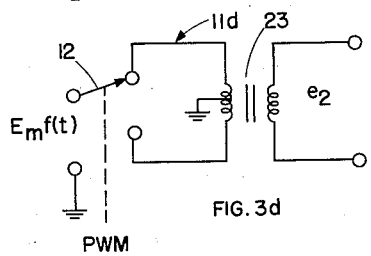

Possible mechanizations of the full wave sampling switch are illustrated as switches 11c and 11d in Figs. 3c and 3d. These embodiments include a transformer having a grounded center-tapped winding for providing a phase inversion. In switch 11c the secondary winding is center-tapped and the modulating-frequency signal is connected to the primary winding. Switch 11d comprises a somewhat different configuration in that the sampled modulating-frequency signal is connected to a center-tapped primary winding of transformer 23. The latter type of switch has the advantage of providing an output signal when the modulating-frequency signal is a direct-current signal whereas in the former type of switch a direct-current signal is not conducted between the primary and secondary transformer windings. A zero output signal is thereby provided by switch 11c for direct-current modulating frequency signals.

The full wave type sampling switches provide an output balanced around the zero axis thereby eliminating the frequencies of the modulating frequency. As will be explained later, this may be of an advantage in certain applications. However, either type switch will operate satisfactorily, and the application and circuit design will determine the one selected. It is to be understood, of course, that in actual practice an electronic switch is to be preferred, and a switch of this type will be illustrated and described hereinafter.

Connected to pulse width modulator 10 is a source of alternating carrier-frequency signal usually of sinusoidal wave form and denoted as $E_c \sin \omega_c t$. Pulse width modulator 10 is so designed that its duty cycle varies in accordance with the instantaneous amplitude of this carrier-frequency input.

Connected to the output of switch 11 is a band pass filter 14. This filter is of such design that it transmits the side bands of the modulated carrier-frequency signal with substantially zero phase shift and attenuates the frequencies of the periodic transmission path and its harmonics and, depending on the type of switch, also the frequencies of the modulating-frequency signal.

The operation of the amplitude modulator will now be described from both a mathematical and a graphical viewpoint. The average output of a periodically occurring rectangular shaped wave form may be calculated from the formula:

Average value of any periodically occurring wave form=

$$\frac{1}{\tau}\int_0^\tau y(t)dt \qquad (1)$$

For the wave form illustrated in Fig. 2:

$$y(t)=1 \quad 0<t<\delta \qquad (2)$$
$$y(t)=-1 \quad \delta<t<\tau \qquad (3)$$

Therefore, letting $E_1$ represent the average value of $e_1$:

$$E_1=\frac{1}{\tau}\int_0^\delta dt+\frac{1}{\tau}\int_\delta^\tau (-1)dt$$

$$=\frac{1}{\tau}[\delta-(\tau-\delta)] \qquad (4)$$

$$=\frac{1}{\tau}(2\delta-\tau)$$

$$=\left(\frac{2\delta}{\tau}-1\right)$$

In a preferred embodiment of the pulse width modulator the duty cycle varies in accordance with the following equation:

$$\frac{2\delta}{\tau}=1+K\sin\omega_c t \qquad (5)$$

where $K$ is the degree of modulation as determined by the design of the pulse width modulator and the amplitude of the reference carrier-frequency signal $E_c\sin\omega_c t$. Substituting Equation 5 in 4 permits writing:

$$E_1=K\sin\omega_c t \qquad (6)$$

The expression for the instantaneous value of $e_1$ is therefore:

$$e_1=K\sin\omega_c t+\text{(pulse repetition rate and associated harmonics)} \qquad (7)$$

The output ($e_2$) of a full wave sampling switch (e.g. switches 11b, c, and d) will be of waveshape similar to $e_1$ except that the height of the pulses will vary according to $E_m f(t)$. Referring to Equation 1 it will be observed that this merely multiplies the average value of the wave by the pulse height. Thus:

$$e_2=E_m f(t)K\sin\omega_c t+\text{(pulse repetition rate and associated harmonics)} \qquad (8)$$

If the frequencies of the pulses from the pulse width modulator are substantially higher than the frequency of the carrier wave $E_c\sin\omega_c t$ a band pass filter can be utilized to pass the side bands associated with the carrier-frequency signal and attenuate the higher frequency terms. The output of band pass filter 14 is therefore:

$$e_{out}=KE_m f(t)\sin\omega_c t \qquad (9)$$

which is the desired amplitude modulated carrier-frequency wave multiplied by a constant term.

The output ($e_2$) of a half wave sampling switch such as switch 11a may be similarly derived by utilizing Equation 1. For this waveform $$y(t)=E_m f(t) \quad 0<t<\delta \qquad (10)$$
$$y(t)=0 \quad \delta<t<\tau \qquad (11)$$

Substituting these conditions in Equation 1

$$E_2=\frac{1}{\tau}\int_0^\delta E_m f(t)+0=\frac{1}{\tau}E_m f(t)\delta \qquad (12)$$

Since the duty cycle varies in accordance with Equation 5

$$E_2=\frac{1}{2}E_m f(t)+\frac{K}{2}E_m f(t)\sin\omega_c t \qquad (13)$$

The expression for the instantaneous value of $e_2$ is therefore:

$$e_2 = \frac{1}{2}E_m f(t) + \frac{K}{2}E_m f(t) \sin \omega_c t + \text{(pulse repetition rate and associated harmonics)} \quad (14)$$

Thus, in order to provide the desired output signal from an amplitude modulator utilizing a half wave sampling switch, it is necessary that the band pass filter also attenuate the frequencies of the modulating-frequency signal.

Figure 5:
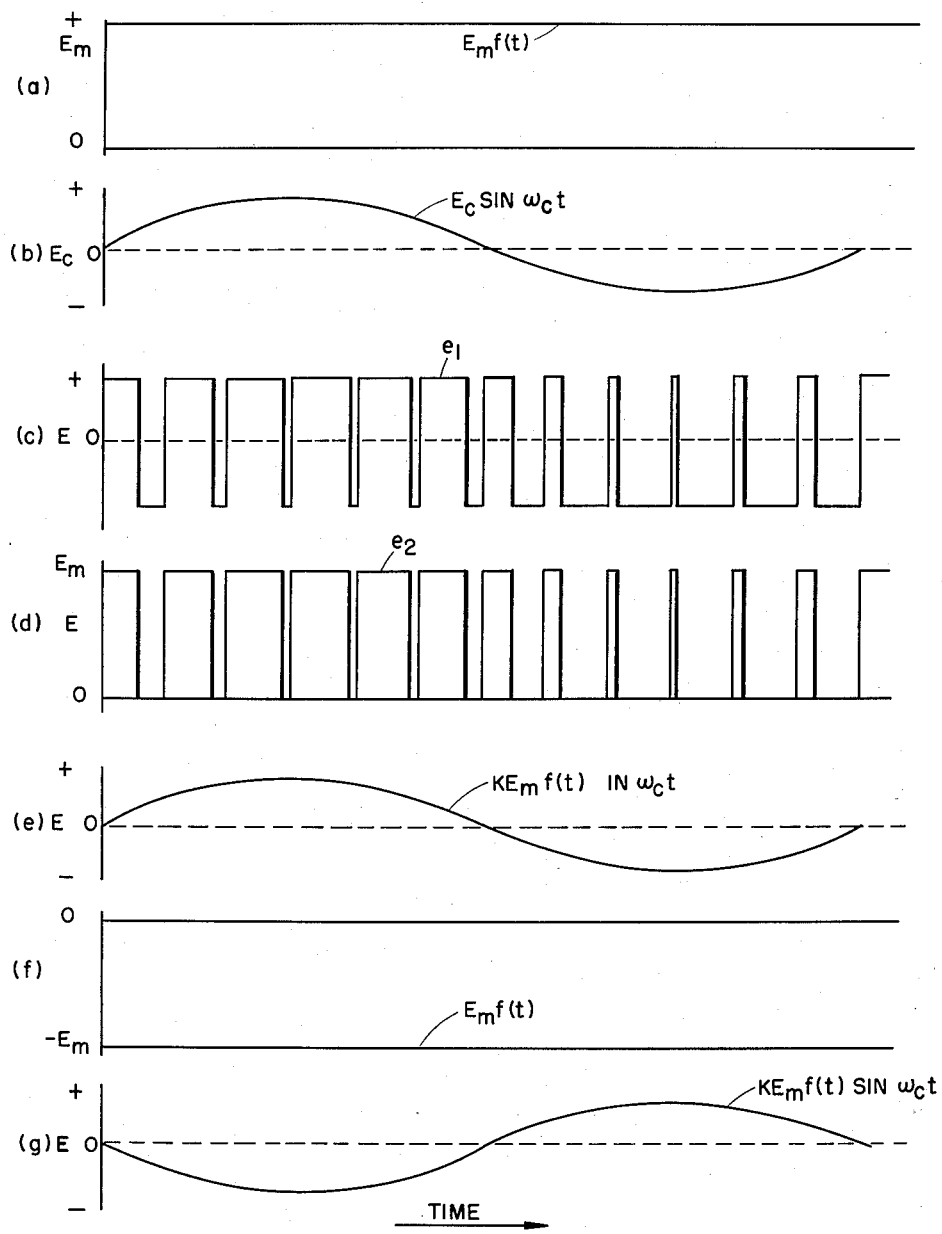

Figs. 4 and 5 graphically illustrate the operation of this invention.

Fig. 4 illustrates Equation 4 by plotting $E_1$ against the duty cycle.

Assuming a linear pulse width modulator circuit, it will be apparent that the average output is respectively +1, 0 and −1 for 100%, 50% and 0% duty cycles. As distinguished from an operating point centered at a 50% duty cycle (denoted by the solid line) other possible operating points are above and below this (denoted by the dotted lines). An obvious disadvantage of these latter operating points is that the maximum amplitude of $E_1$ available in one direction is lower than the amplitudes obtainable when operating centered at the 50% duty cycle point. An attempt to operate the pulse width modulator beyond the 0 and 100% duty cycle points causes distortion of the carrier frequency thereby effecting a degradation of the amplitude modulated signal.

Fig. 5 contains several diagrams showing the various wave form appearing in the amplitude modulator. Since the graphs have a common time base, only a small portion of the wave form of a modulating-frequency signal may be shown because of its relatively low frequency; this signal is illustrated in Fig. 5a and appears as direct-current voltage. Fig. 5b illustrates a single cycle of the carrier-frequency signal. Fig. 5c illustrates the pulse width modulated switching signal $e_1$. Fig. 5d illustrates the output of a half wave sampling switch ($e_2$) and Fig. 5e illustrates the final amplitude modulated wave which, of course, is $e_2$ after it has been passed through the band pass filter 14.

Figs. 5f and 5g illustrate the reversal of phase in the amplitude modulated carrier-frequency output when the modulating-frequency is of negative polarity. Fig. 5f illustrates the wave form of a negative polarity modulating-frequency wave. Fig. 5g illustrates that the output signal is 180° out of phase with the output signal resulting from a positive modulating-frequency signal (illustrated in Fig. 5e).

In order to convey the concept of pulse width modulating a wave form in accordance with a sinusoidally varying carrier signal, the pulse repetition frequency has been illustrated as twelve times that of the carrier frequency. However, in practice the pulse frequency would ordinarily be chosen considerably higher than this in order to reduce the design problems involved in obtaining a suitable band pass filter. For example, in the actual circuit hereinafter described, the modulating frequency signal varies from 0 to approximately 100 c.p.s., the carrrier frequency signal is 400 c.p.s. and the pulse repetition frequency is 25 kc.

The wave form $e_2$ (illustrated in Fig. 5d) is that which is obtained from an unbalance switch such as is shown in Fig. 3a. However, as described above, the use of a balanced switch would merely move the zero reference axis to the mid-point of the pulsed wave form. The final output signal ($e_{out}$) would be the same for either condition provided that suitable band pass filters are utilized.

Fig. 6 illustrates in block diagram form a pulse width modulator in which a negative feedback loop is utilized for reducing the linearity and drift problems which arise in the pulse width modulator stage. As illustrated, the output of the pulse width modulator 10 is connected to two switches 11. Each of the switches 11 is connected to a band pass filter 14. One of the switches has a direct-current reference signal $E_r$ connected thereto. Pulse width modulator 10, both switches 11 and both filters 14 function in the same manner as in the embodiment described above. The output of band pass filter 14 ($e_b$) is added to an input carrier-frequency signal at summation point 16 and amplified in alternating-current amplifier 15, the output of which is utilized to vary the duty cycle of the output of pulse width modulator 10. It will be noted that a closed loop around the pulse width modulator has been formed, thereby enabling part of its output to be fed back. Since the input to the switch in the closed loop is a constant direct-current reference signal ($E_r$), the side bands of the output of the band pass filter 14 will vanish leaving only a carrier-frequency signal. This may be verified by letting the function $f(t)$ remain a constant in Equation 9. The feedback carrier-frequency signal is made negative with respect to the input carrier-frequency signal either in the alternating-current amplifier or by adjusting the polarity of $E_r$. As is well known in the art, negative feedback decreases the magnitude of changes in the output of a system caused by changes within the system. The remaining portion of the circuit illustrated in Fig. 6 is identical to that shown in Fig. 1, switch 11 and filter 14 located without the closed loop being connected so as to sample the modulating-frequency signal.

In the amplitude modulator illustrated in Fig. 6

$$e_1 = G(e_b + E_c \sin \omega_c t) + \text{(pulse repetition rate and associated harmonics)} \quad (15)$$

where G is the gain of amplifier 15. As hereinbefore derived in Equations 7 through 9

$$e_b = GE_R(e_b + E_c \sin \omega_c t) \quad (16)$$

or $$e_b = \frac{GE_R E_c \sin \omega_c t}{1 - GE_R} \quad (17)$$

Substituting Equation 17 in Equation 15 permits writing $$e_1 = \frac{GE_c \sin \omega_c t}{1 - GE_R} \quad (18)$$

Since the term $GE_R$ is substantially greater than 1

$$e_1 = -\frac{E_c \sin \omega_c t}{E_R} \quad (19)$$

and therefore the output signal is:

$$e_{out} = -\frac{E_c}{E_R}E_m f(t) \sin \omega_c t \quad (20)$$

Thus K, the constant of proportionality of the output, is in this instance proportional to $E_c$ and inversely proportional to $E_R$.

In many analog computer applications this version of the amplitude modulator is very useful in that it permits a division of the output signal by the direct-current term $E_R$. Another advantage is that in some computer applications, particularly those in which the computer is airborne, it is quite difficult to provide a reference voltage $E_R$ and an alternating signal $E_c \sin \omega_c t$ with the required stability characteristics. In this invention, however, variations in the absolute value of either $E_c$ or $E_R$ are immaterial so long as each voltage changes proportionally to the other. Thus, if $E_c$ and $E_R$ are derived from the same source of power, an extremely stable system may be provided regardless of variations in the power source.

Fig. 7 illustrates an amplitude modulator in which a single closed loop stage is used to supply a plurality of modulating stages. A plurality of switches 11 are driven by a single pulse width modulator 10 connected in a closed loop as described above in connection with Fig. 6. A separate band pass filter 14 is connected to each of the switches 11. A different modulating-frequency $E_1 f_1(t), E_2 f_2(t), \ldots E_n f_n(t)$, signal may be accommodated at each switch and filter combination. A significant end result is that each input is amplitude modulated by the common carrier-frequency signal. A plurality of modulating stages may likewise be driven by a signal pulse width modulator 10 without utilizing a negative feedback loop. The operation of each modulating stage will be that of the amplitudee modulator illustrated in Fig. 1.

An important advantage of this invention is that a substantially zero phase shift occurs in the modulation process. This is an important requirement for computer applications. In any type of circuit design involving the use of filters, the problem of phase shift will be present to some degree. Thus, in a chopper type modulator, the switching repetition frequency is that of the carrier frequency. The harmonics of the switching frequency are therefore close in frequency to the frequency of the carrier. A filter which will pass the carrier and attenuate the harmonics also causes a phase shift if the carrier-frequency varies even a small amount. In this invention, as distinguished from a chopper modulator, the sampling frequency may be at a considerably higher frequency than the carrier-frequency signal. This reduces considerably the difficulty in designing a filter which attenuates the switching frequencies and transmits the side bands of the amplitude modulated carrier-frequency signal with substantially zero phase shift. A filter comprising passive elements usually permits zero phase shift at only one frequency such as the mid-band frequency. A variation in either the frequency of the carrier or the mid-band frequency of the filter (e.g. due to a change in the passive elements due to temperature variation, etc.) will cause a phase shift in the signal being transmitted through the filter unless otherwise compensated for. In this invention, however, the phase slope may be made relatively small over a range of many cycles per second because of the wide frequency range between the midband and high cutoff frequency. Another feature contributing to minimum phase shift is that of negative feedback introduced as shown in Fig. 6.

A significant corollary is that this invention provides a conversion from a direct-current modulating-frequency signal to an output wave of sinusoidal form. As noted above, the commonly used chopper modulator instead converts a direct-current input to a square wave output.

A further advantage of this design is that it permits a linear circuit to be constructed from fairly simple components. In this invention the linearity and drift of the pulse width modulator circuitry are most prone to introduce system errors. However, the relative ease by which negative feedback may be introduced makes it practical to utilize a simple multivibrator circuit as the pulse width modulator. Of course a circuit of higher linearity may be utilized for the pulse width modulator. An example of such a circuit would be a phantastron circuit.

The operation of this amplitude modulator is inherently that of a suppressed carrier amplitude modulator. Thus, as indicated by Equation 9, the output will be zero for zero modulating-frequency signal input. This feature is of special importance in analog computer applications which require the conversion of the modulating-frequency signal to an alternating signal having an amplitude directly proportional to the amplitude of the modulating-frequency signal. Another reason why a constant carrier signal is usually unnecessary in computer and other applications is that a pure carrier-frequency signal conveys no information. If a carrier-frequency signal is desired at all times an external supply of direct current (not shown) may be connected in addition to the modulating-frequency input.

Fig. 8 illustrates schematically circuitry which may be utilized to construct an embodiment of the invention such as that of Fig. 6. Summation network 16 includes resistors 71 and 72. Connected to resistor 72 is a source of carrier-frequency signal and likewise connected to resistor 71 is the feedback carrier-frequency signal. The output of summation network is coupled to the grid of triode 73 which provides one stage of amplifier 15. The output of the plate of triode 90, the other stage of amplifier 15, is coupled to a phase splitter circuit including triode 17. The voltage drop across the cathode connected resistor 24 is in phase with the input to triode 17. Contrariwise, the voltage between plate 18 of triode 17 and ground is inversely proportional to the input signal to triode 17. This is caused by the voltage drop between plate 18 and the B+ supply due to current flow in resistor 19 when triode 17 conducts. Signals 20 and 21 are the two outputs of the phase splitter and are therefore 180° out of phase with each other.

The signals 20 and 21 are fed to the grids of triodes 30 and 31. Triodes 30 and 31 are connected as a freerunning multivibrator functioning as pulse width modulator 10. Variable capacitors 32 and 33 connecting the grid of each triode with the plate of the other are adjusted so that the multivibrator oscillates at the desired pulse repetition frequency. Capacitors 32 and 33 also adjust the median duty cycle to 50%. The necessity for the latter adjustment is that an operating zero reference level at more or less than the 50% duty cycle does not permit a maximum swing in the positive or negative going cycles of the carrier frequency. The output of the pulse width modulator would therefore have to be of limited amplitude in order to avoid clipping which would cause undesirable distortion in the carrier-frequency wave form. This is illustrated by the dotted lines in Fig. 4.

The variable duty cycle output of modulator 10 is obtained by varying the cut-off and conducting periods of the two triode stages. For example, for carrier-frequency inputs 20 and 21, triode 30 will tend to conduct sooner than it would without a positive going carrier-frequency signal on its grid while simultaneously triode 31 will tend to cut off sooner due to the negative going half cycle of the carrier frequency on its grid. The conducting and cutoff times of triodes 30 and 31 will vary, therefore, sinusoidally according to the frequency of the carrier signal. The desired PWM output at junction point 34 will therefore be a series of pulse width modulated pulses.

Capacitor 35 couples the output from point 34 of the multivibrator stage with the succeeding stage and removes the direct-current information carried by the multivibrator output. The average value of output signal 37 therefore is always zero. Diodes 38 and 39 are connected so as to clip the amplitudes of both positive and negative polarity pulses of signal 37. A signal 40 is formed thereby having positive and negative pulses of equal magnitude. This type of signal was previously shown as $e_1$ in Figure 5c.

Signal 40 is taken from across the cathode resistor 135 of a cathode follower stage 50. Stage 50 provides a low impedance input to switches 51a and 51b. Switches 51a and 51b are vacuum tube embodiments of the type of switch illustrated as 11a in Fig. 3a. They each comprise two pair of triodes 52, 53 and 54, 55, each having their grids connected to secondaries of transformer 56. Signal 40 is introduced into the primary of transformer 56 from the output of cathode follower 50. As denoted by the dot convention, during positive polarity pulses of signal 40 triodes 52 and 54 will be biased so as to conduct while triodes 53 and 55 are cut off. The modulating frequency signal $E_m f(t)$ and the constant direct-current reference signal ($E_r$) are introduced between ground and the plate of triode 52 and cathode of triode 54 of respective switches 51a and 51b. During the period that triodes 52 and 54 are conducting, the signals $E_m f(t)$ and $E_r$ will be conducted through respective triodes 52 or 54 depending upon whether they are of positive or negative polarity, i.e., $E_m f(t)$ and $E_r$ will appear unchanged at the output of switch 51a. During negative polarity pulses of signal 40, triodes 52 and 54 are cut off while triodes 53 and 55 are biased so as to conduct. A low impedance path therefore connects the output of switches 51a and 51b with ground and the output signal of both switches are, of course, zero. It will be observed that the switching triodes 52, 53, 54 and 55 have functioned in a manner similar to that of the mechanical switch illustrated in Fig. 3a.

Connected to the output of switches 51a and 51b are filter circuits 57a and 57b utilized as band pass filters 14. Filter circuits 57a and 57b comprise resistance elements 58, 59, 60, inductance element 61, and capacitance elements 62, 63, and 64. The output of filter 57a comprises the output amplitude modulated carrier-frequency signal. The output of filter 57b comprises the feedback carrier-frequency signal.

Fig. 9 illustrates the attenuation characteristics of filters 57a and 57b. It will be noted that a very high attenuation is provided for the frequencies and side bands connected with the repetition frequency of the pulse output from the pulse width modulator and also for the frequencies of the modulating-frequency signal. As previously noted, the utilization of a balanced switch would have obviated the necessity of attenuating the frequencies of the modulating-frequency signal.

Filter circuits 57a and 57b are also preferably designed so as to have zero phase shift at the mid-band frequency. Although a filter made up of passive elements will have some phase variation as the frequency changes from the mid-band frequency, it was found that a filter of this type was satisfactory when combined with negative feedback in the closed loop circuit. For applications demanding even higher accuracy, band-pass filters including active elements would provide a substantially zero phase change over a range of many cycles.

The circuit of Fig. 8 was tested successfully using the following values of circuit components:

| | |
|---|---|
| Resistor 71 | 1 megohm. |
| Resistor 72 | 1 megohm. |
| Triode 73 | 12AX7. |
| Resistor 74 | 1K ohm. |
| Resistor 75 | 200K ohms. |
| Capacitor 76 | .033 microfarad. |
| Resistor 77 | 50K ohms. |
| Resistor 78 | 1 megohm. |
| Capacitor 79 | .22 microfarad. |
| Resistor 80 | 1 megohm. |
| Triode 90 | 12AX7. |
| B+ supply 91 | +165 volts. |
| Resistor 92 | 200K ohms. |
| Resistor 93 | 1K ohm. |
| Resistor 94 | 10 megohms. |
| Capacitor 95 | .22 microfarad. |
| Resistors 96 and 97 | 470K ohms. |
| B— supply 98 | —150 volts. |
| Resistors 19 and 24 | 47K ohms. |
| Triode 17 | 12AU7 |
| Resistors 99 and 110 | 10 megohms. |
| Capacitors 100 and 111 | .22 microfarad. |
| Resistors 112 and 113 | 470K ohms. |
| Triodes 30 and 31 | 12AU7 |
| Resistors 114 and 119 | 4.7 megohms. |
| Resistors 115 and 118 | 6.8K ohms. |
| Adjustable capacitors 32 and 33 | 5 to 25 micromicrofarads. |
| Capacitor 35 | .22 microfarad. |
| Resistor 120 | 10K ohms. |
| Diodes 38 and 39 | 1N67A. |
| Resistor 130 | 150K ohms. |
| Resistor 131 | 50K ohms. |
| Resistor 132 | 140K ohms. |
| Capacitors 133 and 134 | 0.15 microfarad. |
| Triode 50 | 12AU7. |
| Resistor 135 | 22K ohms. |
| Resistor 136 | 1K ohm. |
| Transformer 56 | Core material, 1DU–HY6 manufactured by Magnetic Metals Co., Camden, N.J. Turns ratio 2:1:1:1:1. Wire size, all windings —44HF. Number of turns, 430: 215:215:215. |
| Capacitor 137 | 1 microfarad. |
| Resistors 138, 139, 140 and 141 | 470 ohms. |
| Triodes 52, 53, 54, and 55 | 12AT7. |
| Resistor 58 | 1K ohm. |
| Resistor 59 | 25K ohms. |
| Resistor 60 | 56K ohms. |
| Inductor 61 | 1 henry. |
| Capacitor 62 | 3200 micromicrofarads. |
| Capacitor 63 | .015 microfarad. |
| Capacitor 64 | .048 mircofarad. |

In the circuit test the carrier-frequency signal was 400 c.p.s. with 0.06% distortion and the pulse repetition frequency was 25K c.p.s. The range of magnitude for $E_m$ were —100 volts to +100 volts maximum and $E_r$ was 100 volts. A summary of the results obtained from the modulator is given in the following table:

| | |
|---|---|
| Range of $e_{out}$ | —20 v. R.M.S. to +20 v. R.M.S. |
| Non-linear error | 0.25% of full scale output (20 v. R.M.S.). |
| Phase shift | 0.25% maximum within frequency range of 380 to 420 c.p.s. |

The circuitry of Fig. 8 could, of course, be utilized to duplicate the embodiments of the invention illustrated in Figs. 1 and 7. In the embodiment of Fig. 1, the circuitry comprising amplifier 15, summation point 16, and one switch and filter combination are unnecessary. For the embodiment shown in Fig. 7, additional secondary windings for transformer 56 would be necessary, or in the alternative additional transformers such as 56 would have their primary windings connected to the output of the cathode follower stage 50.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an amplitude modulator for providing a sinusoidal output of carrier frequency having an amplitude directly proportional to the amplitude of a relatively slowly varying modulating frequency signal, means for periodically sampling a modulating-frequency signal, means for varying said sampling periods according to an alternating carrier-frequency signal, and means connected to said sampled modulating-frequency signal for transmitting the side bands associated with the carrier-frequency signal and attenuating the frequencies of the sampling period and the harmonics associated therewith.

2. The amplitude modulator recited in claim 1 wherein said means connected to said sampled modulating-frequency signal comprises a band-pass filter having a mid-band frequency at the frequency of the carrier-frequency signal and an upper cutoff frequency below the frequencies of the sampling period and the harmonics associated therewith, said filter having substantially zero phase shift at said mid-band frequency.

3. In an amplitude modulator for providing a sinusoidal output of carrier frequency having an amplitude directly proportional to the amplitude of a relatively slowly varying modulating frequency signal, an input and output, switch means periodically interconnecting said input and said output of said amplitude modulator, a modulating-frequency signal connected to said input, means for causing the duty cycle of said switch means to vary proportionally to an alternating carrier-frequency signal, and means interposed between said switch means and said output for transmitting the side bands of the modulated carrier-frequency signal and attenuating the frequencies of said periodic transmission path and its harmonics.

4. In an amplitude modulator for providing a sinusoidal output of carrier frequency having an amplitude directly proportional to the amplitude of a relatively slowly varying modulating frequency signal, means for supplying a periodic pulsed signal, means for varying the duty cycle of said pulsed signal in accordance with an alternating carrier-frequency signal, switching means connected to said pulsed signal of varying duty cycle for sampling a modulating-frequency signal, and means connected to said switching means for transmitting the side bands of the modulated carrier-frequency signal and attenuating the frequencies of the periodic pulsed signal and its harmonics.

5. In an amplitude modulator for providing a sinusoidal output of carrier frequency having an amplitude directly proportional to the amplitude of a relatively slowly varying modulating frequency signal, a source of periodic pulsed signal comprising an alternating, rectangular-shaped wave, a source of alternating carrier-frequency signal, a pulse width modulator circuit connected to said sources of periodic pulsed signal and carrier-frequency signal for varying the duty cycle of said pulsed signal in accordance with said alternating carrier-frequency signal, a switch having an input and an output connected to said pulse width modulator and further having a duty cycle variable in response to the duty cycle of the pulse width modulator output signal, a source of modulating-frequency signal connected to the input of said switch and a filter connected to the output of said switch for transmitting the side bands of the modulated carrier-frequency signal and attenuating the frequencies of the periodic pulsed signal and its harmonics.

6. In an amplitude modulator, switch means alternately interconnecting a modulating-frequency signal with a pair of low impedance paths each of which are connected to an output of said amplitude modulator, one of said low impedance paths including a phase inverter, means for varying the duty cycle of said switch means proportionally to an alternating carrier-frequency signal, and means for transmitting the side band frequencies associated with said carrier-frequency signal and attenuating the frequencies associated with the operating frequency of said switch means.

7. In an amplitude modulator, means for supplying a periodic pulsed signal, means for varying the duty cycle of said pulsed signal in accordance with an alternating carrier-frequency signal, switching means connected to said pulsed signal of varying duty cycle for sampling a modulated frequency signal and its phase inverse, and means connected to the output of said switching means for transmitting the side bands of the modulated carrier-frequency signal and attenuating the frequencies of the periodic pulsed signal and its harmonics.

8. In an amplitude modulator, first means for periodically sampling a modulating frequency signal, second means for periodically sampling a reference signal, third and fourth means respectively connected to said sampled modulating-frequency signal and said sampled reference signal for transmitting carrier-frequency and modulated carrier-frequency signals and attenuating the frequencies of the sampling period and the harmonics associated therewith, the output of said fourth means comprising a feedback carrier-frequency signal, a source of input carrier-frequency signal, and means responsive to the sum of said feedback and said input carrier-frequency signals for controlling said first and second means to vary the duration of said sampling periods, the output of said third means comprising the desired amplitude modulated, carrier-frequency signal.

9. In an amplitude modulator, first and second means for periodically providing a low impedance transmission path between first and second inputs and first and second outputs respectively, means for supplying a reference signal connected to said first input, means for feeding a modulating-frequency signal to said second input, first and second filter means connected to each of said first and second outputs for transmitting carrier-frequency and modulated carrier-frequency signals and attenuating the frequencies of said periodic transmission path and its harmonics, the output of said first filter means comprising a feedback carrier-frequency signal, a source of input carrier-frequency signal, and means for controlling said first and second means to vary said periods of low impedance transmission according to the sum of said feedback and said input carrier-frequency signals, the output of said second filter means comprising the desired amplitude modulated, carrier-frequency signal.

10. In an amplitude modulator, means for supplying a periodic pulsed signal, first and second switching means connected to said pulsed signal and controlled by the duty cycle thereof, means for feeding a reference signal to said first switching means, first filter means connected to said first switching means for transmitting the carrier-frequency signal and attenuating the frequencies of the periodic pulsed signal and its harmonics, means for feeding a modulating-frequency signal to said second switching means, and second filter means connected to said second switching means for transmitting the side bands of the modulated carrier-frequency signal and attenuating the frequencies of the periodic pulsed signal and its harmonics, the output of said first filter means comprising a feedback carrier-frequency signal, a source of input carrier-frequency signal, and means for varying the duty cycle of said pulsed signal in accordance with the sum of said feedback and said input carrier-frequency signals, the output of said second filter means comprising the desired amplitude modulated carrier-frequency signal.

11. In an amplitude modulator, a plurality of means for periodically providing a low impedance path between inputs and outputs of said amplitude modulator, a modulating-frequency signal connected to each of said inputs, means for varying said periods of low impedance according to an alternating carrier-frequency signal, and means connected to each of said outputs for transmitting the side bands of the modulated carrier-frequency signal and attenuating the frequencies of said periodic transmission path and its harmonics.

12. In an amplitude modulator, means for supplying a periodic pulsed signal, a first switching means connected to said pulsed signal of varying duty cycle and controlled by the duty cycle thereof, means for feeding a reference signal to said first switching means, a plurality of second switching means also connected to said pulsed signal of varying duty cycle and each respectively controlled by the duty cycle thereof, each of said switching means sampling a modulating-frequency signal, means for feeding a modulating-frequency signal to each of said second switching means, first filter means connected to said first switching means for transmitting the carrier-frequency signal and attenuating the frequencies of the periodic pulsed signal and its harmonics, second filter means connected to each of said second switching means for transmitting the side bands of the modulated carrier-frequency signal and attenuating the frequencies of the periodic pulsed signal and its harmonics, the output of said first filter means comprising a feed-back carrier-frequency signal, a source of input carrier-frequency signal, and means for varying the duty cycle of said pulsed signal in accordance with the sum of said feed-back and said input carrier-frequency signals, the output of each of said second filter means comprising an amplitude modulated carrier-frequency signal.

13. An amplitude modulator comprising first and second filters, first and second input terminals for respectively receiving a modulating signal and a reference signal, a first switching device connected between said first terminal and said first filter, a second switching device connected between said second terminal and said second filter, a third input terminal for receiving a carrier signal, a summing network having first and second inputs respectively connected with said second filter and said third input terminal, a pulse width modulator having a modulating input from said summing network, said pulse width modulator having an output connected to operate said switching devices, said first filter providing an output of said amplitude modulator.

14. An amplitude modulator for providing a sinusoidal output of predetermined frequency having an amplitude directly proportional to the amplitude of a relatively slowly varying modulating signal comprising, a filter having a pass band including said predetermined frequency, an input terminal for receiving said modulating signal, a switching device periodically operable to provide a low impedance path between said input terminal and said filter in one condition of said switching device and to provide a low impedance path shunting the input to said filter in another condition of said switching device, a second input terminal for receiving a carrier signal of said predetermined frequency, a pulse width modulator having a pulse width modulating input from said second input terminal and having a pulse repetition rate considerably higher than the pass band of said filter, and means responsive to said pulse width modulator for operating said switching device between said conditions thereof in accordance with the duration of pulses produced by said pulse width modulator.

References Cited in the file of this patent

UNITED STATES PATENTS

| | | |
|---|---|---|
| 2,451,347 | McShan | Oct. 12, 1948 |
| 2,485,948 | Williams et al. | Oct. 25, 1949 |
| 2,491,969 | Gloess | Dec. 20, 1949 |
| 2,619,632 | Krumhansl et al. | Nov. 25, 1952 |
| 2,657,269 | Starr et al. | Oct. 27, 1953 |
| 2,695,988 | Gray | Nov. 30, 1954 |
| 2,707,268 | Person | Apr. 26, 1955 |
| 2,724,742 | Chesnut | Nov. 22, 1955 |